United States Patent [19]

Crasset

[11] Patent Number: 5,611,247
[45] Date of Patent: Mar. 18, 1997

[54] GEARBOX ACTUATING DEVICE

[76] Inventor: Dominique Crasset, 4 Square Van Gogh, Soisy Sous Montmorency, France

[21] Appl. No.: 522,373

[22] PCT Filed: Mar. 15, 1994

[86] PCT No.: PCT/FR94/00276

§ 371 Date: Nov. 3, 1995

§ 102(e) Date: Nov. 3, 1995

[87] PCT Pub. No.: WO94/21485

PCT Pub. Date: Sep. 29, 1994

[30] Foreign Application Priority Data

Mar. 18, 1993 [FR] France .................. 93 03131

[51] Int. Cl.⁶ .................................. B60K 20/00
[52] U.S. Cl. .................... 74/473 R; 477/174; 180/300
[58] Field of Search ................ 74/336.5, 335, 74/333, 473 R; 477/174, 175; 180/291, 300

[56] References Cited

U.S. PATENT DOCUMENTS

| 4,805,720 | 2/1989 | Clenet | 180/291 X |
| 4,943,092 | 7/1990 | Haraguchi | 180/300 X |
| 5,046,578 | 9/1991 | Nakayama et al. | 180/291 |
| 5,129,479 | 7/1992 | Fujii et al. | 180/300 X |
| 5,364,061 | 11/1994 | Ciolczyk et al. | 180/300 X |
| 5,439,425 | 8/1995 | Ramm et al. | 477/175 X |

FOREIGN PATENT DOCUMENTS

| 766828 | 7/1934 | France | 5/3 |
| 877118 | 6/1941 | France | 5/3 |
| 2688747 | 12/1993 | France. | |
| 3920245 | 5/1990 | Germany. | |

*Primary Examiner*—Charles A. Marmor
*Assistant Examiner*—Peter T. Kwon
*Attorney, Agent, or Firm*—Graham & James LLP

[57] ABSTRACT

This device comprises levers and cables (21, 29, 23) for actuating a clutch which is located between an engine and the gearbox, spring (37) for determining the angle through which the engine is rocked with respect to a nominal operating position, and cable (39) for opposing clutch engagement when the angle of rocking is greater than a predetermined angle.

6 Claims, 3 Drawing Sheets

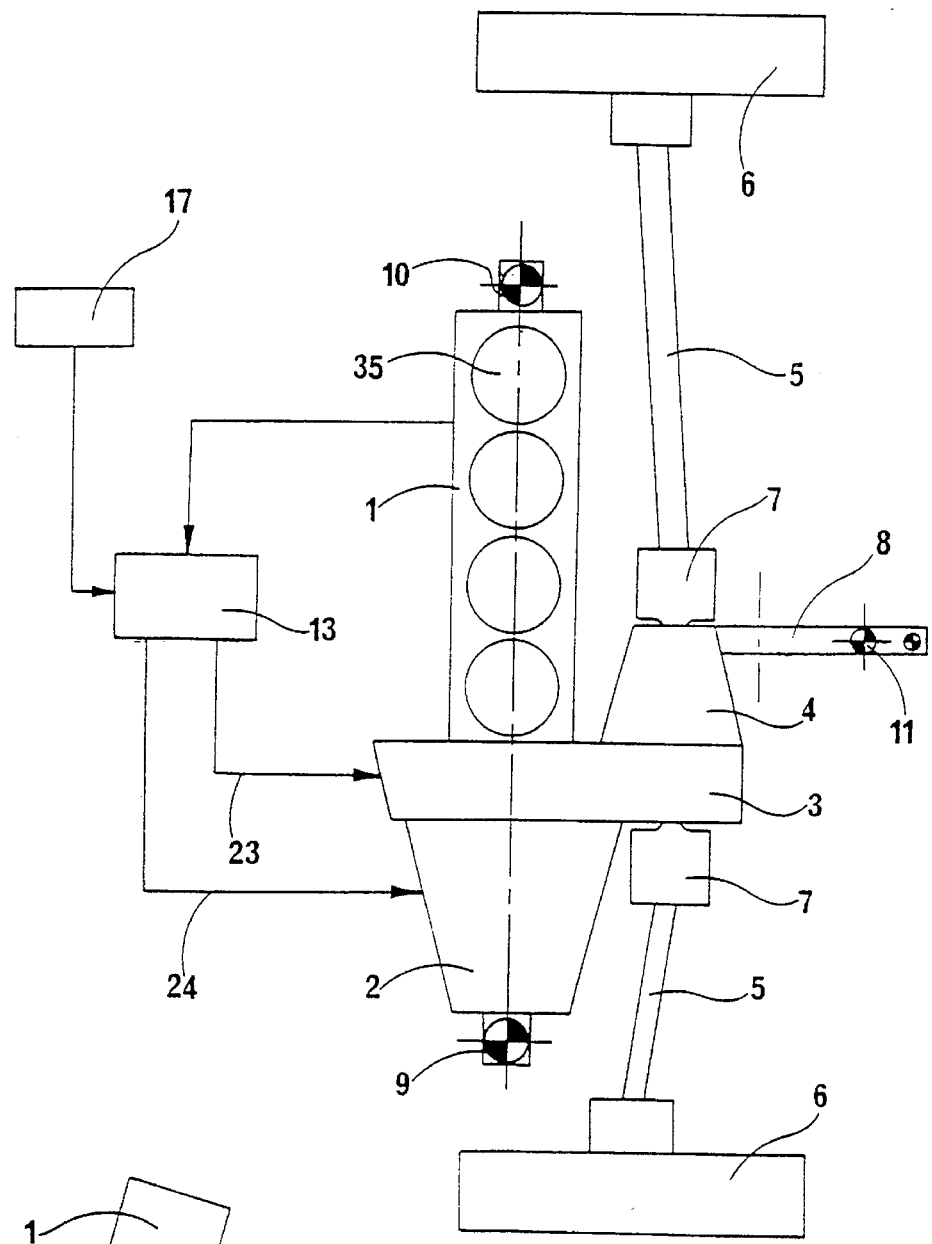
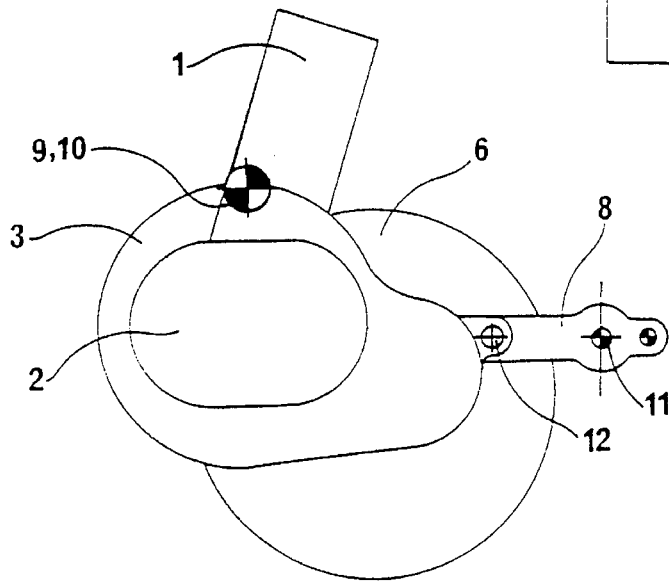

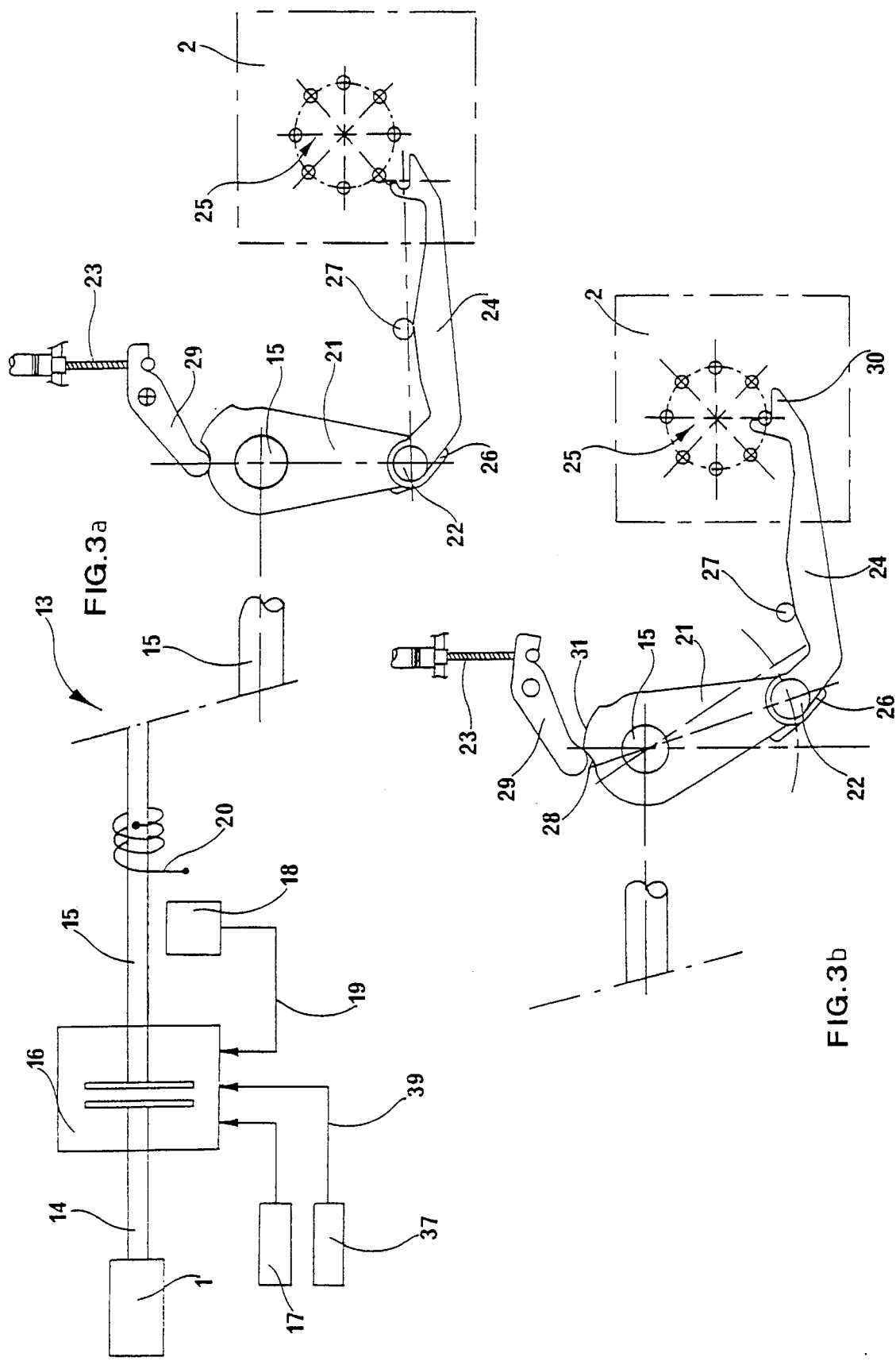

5,611,247

GEARBOX ACTUATING DEVICE

FIELD OF THE INVENTION

BACKGROUND OF THE INVENTION

The present invention relates to a device for actuating the gearbox associated with an engine, especially an automobile, and more particularly such a device comprising:
- control means for controlling coupling means;
- a gearbox actuating member;
- a first shaft driven in rotation by the engine;
- a second shaft designed to drive the gearbox actuating member;
- coupling means for coupling the second shaft to the first shaft under the action of the control means; and
- uncoupling and return means for uncoupling the second shaft from the first shaft after the second shaft has rotated through a predetermined angle, and returning the second shaft to its initial position after it has been uncoupled from the first shaft;

Such a device is known from document FR-A-877 118.

In the device of this document, an input shaft is driven by the engine and carries a first series of plates of a plate-type friction clutch. The second series of plates of this clutch is carried by another shaft capable of driving an output shaft in rotation. A control member interacting with a screw and nut system allows the plates to be pressed together and thus allows the input shaft and the output shaft to be joined together in terms of rotation. The screw and nut system is made so that after the shaft carrying the second series of plates, and therefore the output shaft, have rotated by a certain amount, the pressure between the plates ceases and the input shaft and output shaft are thus declutched. A spring then returns the output shaft to its original position.

The aforementioned document makes no provision for actuating a clutch located in the traditional fashion between the engine and a mechanical gearbox, also using the device described.

The automatic control of such a clutch in fact involves serious difficulties. Indeed, after changing gear it is necessary to rematch the rotational speed of the engine to the speed of the vehicle so as to avoid abrupt jarring when letting the clutch back out.

This is particularly important when "downshifting" (shifting from one gear ratio to a lower ratio), when abrupt engagement of the clutch while the engine is idling leads to abrupt braking of the vehicle.

In the absence of an automatic gearshifting device, the driver in these cases on the one hand accelerates so as to bring the engine up to a sufficient speed and, above all, slows down his letting-out of the clutch in order to cause the latter to slip, so as to lead to a progressive slowing-down of the vehicle at the same time as correspondingly accelerating the rotational speed of the engine.

SUMMARY OF THE INVENTION

The present invention aims to improve the devices of the above type so as to allow them to control not only a gearbox but also the clutch associated with it.

To this end, the subject of the invention is a device for actuating the gearbox associated with an engine, especially of an automobile, comprising:
- control means;
- a gearbox actuating member;
- a first shaft driven in rotation by the engine;
- a second shaft designed to drive the gearbox actuating member;
- coupling means for coupling the second shaft to the first shaft under the action of the control means; and
- uncoupling and return means for uncoupling the second shaft from the first shaft after the second shaft has rotated through a predetermined angle, and returning the second shaft to its initial position after it has been uncoupled from the first shaft;

wherein it furthermore comprises:
- means for actuating a clutch which is located between the engine and the gearbox, these means being designed to be driven by the second shaft;
- means for determining the angle through which the engine is rocked with respect to a nominal operating position; and
- means for opposing the engagement of said clutch by its actuating means when the angle of rocking is greater than a predetermined angle.

The means for opposing the clutch engagement may of course either prevent this engagement, or just slow it down.

Moreover, a rocking torque corresponds to each angle of rocking of the engine. It is therefore possible to measure the angle of rocking indirectly by measuring the torque, and therefore to replace the distance measurements described hereinbelow by load measurements. This is particularly the case when the engine is rigidly linked.

Engines, especially engine vehicle engines, are in fact generally linked on a chassis via elastic links. As a result, when a resistive torque is applied to their output shaft or to the output shaft of the gearbox with which they are associated, the engine undergoes a rocking movement with respect to the chassis. This rocking movement consequently represents the torque applied to the output shaft.

If this angle is determined, information can be obtained therefrom regarding the resistive torque applied to the output shaft.

Consequently, when the engine speed is too slow with respect to the speed of the vehicle during an attempt to let out the clutch, the output shaft is braked abruptly and the engine tends to rock on its chassis. This rocking in turn, by virtue of the invention, gives rise to a reaction which tends to prevent clutch engagement. It therefore follows that the clutch slips until the engine speed is progressively brought up to the value corresponding to the speed of the vehicle.

The device according to the invention may in contrast be used to oppose clutch engagement during the start-up phase when the engine is therefore driving and not braking, for as long as the torque is insufficient.

In a specific embodiment of the invention, said means for opposing clutch engagement may comprise inhibition means designed to oppose the uncoupling and return means.

Also in a specific embodiment, the means for determining the angle of rocking of the engine may comprise means for determining the distance between a point that can move with the engine and a fixed point on a chassis for supporting the engine.

The means for determining this angle may be of any suitable type, especially mechanical, electrical, or hydraulic.

BRIEF DESCRIPTION OF THE DRAWING

A specific embodiment of the invention will now be described by way of non-limiting example with reference to the appended diagrammatic drawings in which:

FIG. 1 is a plan view of an engine assembly equipped with a device according to the invention, FIG. 2 is a side view of the assembly of FIG. 1, FIG. 3a is an overall view of a device according to the invention, FIG. 3b is a part view corresponding to part of FIG. 1a in another configuration of the device.

DETAILED DESCRIPTION OF THE PREFERRED EMBODIMENT

Figure 4:
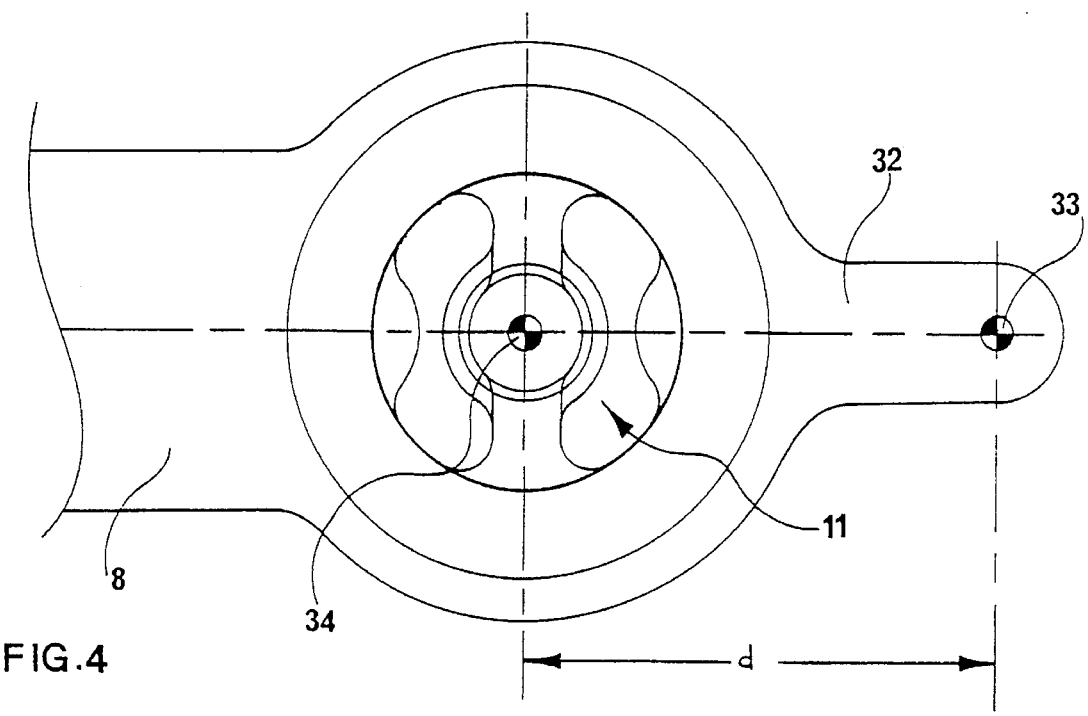
FIG. 4 is a detail view of part of FIG. 3, and FIGS. 5a, 5b and 5c represent means capable of measuring the angle of rocking of the engine.

Visible in FIGS. 1 and 2 which represent the driving members and front axle assembly of a vehicle, are an engine 1, associated in known fashion with a gearbox 2, with a clutch 3 and with a differential 4. The two outputs from the differential 4 are connected to the shafts 5 for driving the wheels 6 via constant velocity joints 7.

Finally, a link rod 8 is articulated to the differential 4.

The assembly consisting of the engine 1, the gearbox 2, the clutch 3, the differential 4 and the joints 7 is linked on the chassis of the vehicle via a three-point fastening 9, 10 and 11, each of these points being equipped with an elastic link of known type. The links 9 and 10 are situated at the same height, one on the engine 1 and the other on the gearbox 2. The link 11 is produced at the opposite end of the link rod 8 from its point 12 articulated to the differential 4.

The aforementioned assembly is therefore suspended by the points 9 and 10, the rotational torque of the engine being taken up by the chassis at the point 11, via the link rod 8.

The assembly represented in FIGS. 1 and 2 of course comprises the conventional driving links between the engine, the gearbox and the clutch, allowing selective drive of the wheels 6 from the engine 1 with the desired reduction ratio.

According to the invention, there is also a link between the engine 1 and the member for controlling the gearbox 2 on the one hand, and the member for controlling the clutch 3 on the other hand. This link consists of an actuating device 13 according to the invention allowing the gearbox 2 and the clutch 3 to be controlled.

The output shaft 14 of the engine or an auxiliary shaft driven by the latter can be seen in FIG. 3a.

This first shaft 14 can drive a second shaft 15 via a clutch 16 of any known type, for example a friction, cone, plate, electromagnetic, or hydraulic clutch.

Engagement of the clutch 16 is brought about by a means 17, especially a manual means, for example a lever linked on the steering wheel of the vehicle.

FIG. 3a also shows a member 18 of any known type capable of detecting the rotation of the shaft 15 and, by a link 19, of disengaging the clutch 16 when the shaft 15 has rotated through a predetermined angle after the clutch 16 has been engaged.

Finally, elastic return means 20 make it possible, after the clutch 16 has been disengaged following a rotation of the shaft 15 through the predetermined angle, to return this shaft 15 to its initial position.

The assembly 14–20 which has just been described hereinabove is of the type represented in the aforementioned document FR-A-877 118 and will therefore not be described in any more detail.

The end of the shaft 15 is secured in terms of rotation to an actuating lever 21 carrying a ball joint 22 at its end.

The lever 21 controls a cable 23 causing engagement or disengagement of the clutch 3, and the ball joint 22, via a forked lever 24, controls the selection barrel 25 of the gearbox 2, in the same way as in motorcycles. The lever 24 is pressed against a limit stop 27 by a hairpin spring 26.

The lever 21 forms a cam 28 interacting with a cam follower formed by another lever 29 to which the cable 23 for causing engagement or disengagement of the clutch 3 is connected.

During the disengagement travel of the lever 21, play between the lever 24 and the selector barrel 25 allows the clutch 3 to be disengaged after which the barrel is driven by the fork 30 of the lever 24, while the cam follower lever 29 continues on a neutral part 31 of the lever 21.

When the shaft 15 returns to its starting position under the action of the elastic return means 20, the fork 30 is disengaged from the selector barrel 25 and the cam follower lever 29 travels back down the cam surface 28, re-engaging the clutch 3 and consequently re-engaging the engine.

If reference is now made to FIG. 4, it can be seen that the link rod 8 has a shank 32 on which a pin 33 is linked. The pin 34 secured to the chassis of the vehicle on which the elastic link 11 is linked can moreover be seen in this same figure.

It will be understood that when the engine 1 rocks about the pin 34 passing through the links 9 and 10 under the effect of a resistive torque applied to its output shafts, and when this rocking is blocked by the link rod 8, the rubber annular part of the link 11 is crushed, so that the distance d between the pins 33 and 34 varies.

Figure 5A:
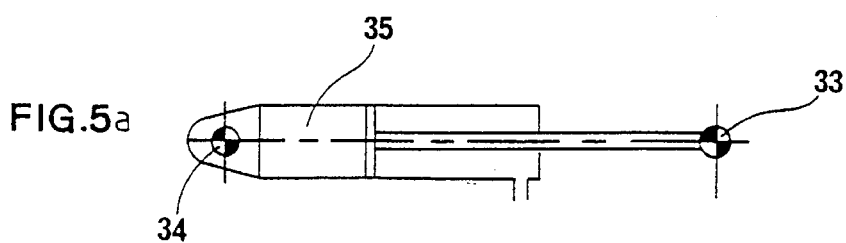
Figure 5B:
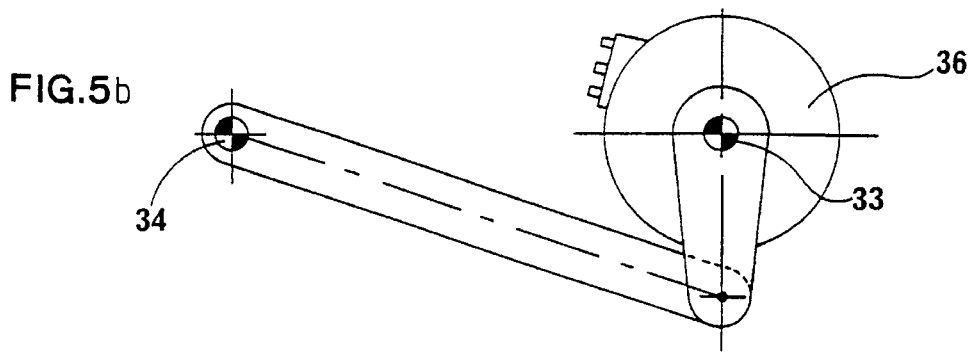

The distance between the pins 33 and 34 is measured, for example, as in FIG. 5a with the aid of a hydraulic or pneumatic cylinder 35 or, as in FIG. 5b, with the aid of a potentiometer 36.

Figure 5C:
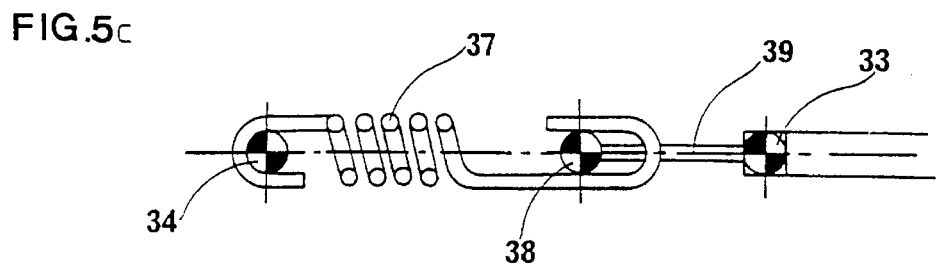

The angle of rocking may equally be measured as in FIG. 5c with the aid of a helical spring 37, the two ends of which are hook-shaped, one being fastened to the pin 34 and the other being connected with play to the end 38 of a cable 39.

The other end of the cable 39 controls a push rod (not represented) keeping the plates of the clutch 16 in contact. This push rod may for example exert on the plates a thrust which compensates for the action of the disengagement means.

When the rocking of the engine 1 reaches a predetermined angle corresponding to the play between the spring 37 and the end 38 of the cable 39, the spring 37 pulls on the cable 39 and brings the push rod secured to the other end of this cable into a position in which it prevents or slows down the disengagement of the clutch 16. Thus, the shaft 15 cannot be pulled back by the return spring 20, the cam follower 29 remains on the top part of the cam 31, and the cable 23 keeps the clutch 3 in the disengaged position.

In actual fact, the clutch 3 will slip progressively, thus driving the engine 1 whose rotational speed will increase. The resistive torque at the output of the engine 1 will thus decrease as will its angle of rocking. The cable 39 will thus progressively release the clutch 16 which will be able to disengage and allow the shaft 15 to return to its starting position and complete re-engagement of the clutch 3.

The push rod keeping the plates of the clutch 16 in contact could be controlled using a cylinder, itself actuated by the piston 35, in cases where the device of FIG. 5a would be used to determine the distance between the pins 33 and 34.

In the case of an electromagnetic clutch controlled by an electronic circuit, the angle sensor using a potentiometer 36 would be the most appropriate means for measuring the angle of rocking of the engine.

I claim:

1. A device for actuating the gearbox (2) associated with an engine (1), comprising:

control means (17) for controlling coupling means;

a gearbox actuating member (21, 24);

a first shaft (14) driven in rotation by the engine;

a second shaft (15) designed to drive the gearbox actuating member;

coupling means (16) for coupling the second shaft to the first shaft under the action of the control means; and uncoupling and return means (18–20) for uncoupling the second shaft from the first shaft after the second shaft has rotated through a predetermined angle, and returning the second shaft to its initial position after it has been uncoupled from the first shaft;

wherein it furthermore comprises:

means (21, 29, 23) for actuating a clutch which is located between the engine and the gearbox, these means being designed to be driven by the second shaft;

means (35; 36; 37–39) for determining the angle through which the engine is rocked with respect to a nominal operating position; and means (39) for opposing the engagement of said clutch by its actuating means when the angle of rocking is greater than a predetermined angle.

2. The device as claimed in claim 1, in which said means for opposing clutch engagement comprise inhibition means designed to oppose the uncoupling and return means.

3. The device as claimed in claim 1, in which said determining means comprise means for determining the distance between a point that can move with the engine and a stationary point of a chassis for supporting the engine.

4. The device as claimed in claim 1, in which said determining means are mechanical means (37–39).

5. The device as claimed in claim 1, in which said determining means are electric means (36).

6. The device as claimed in claim 1, in which the determining means are hydraulic means (35).

* * * * *